United States Patent
Schindall et al.

(10) Patent No.: US 6,201,961 B1
(45) Date of Patent: Mar. 13, 2001

(54) USE OF REFERENCE PHONE IN POINT-TO-POINT SATELLITE COMMUNICATION SYSTEM

(75) Inventors: Joel Schindall, Poway; J. Kurt Brock, Mountain View, both of CA (US)

(73) Assignees: Globalstar L. P., San Jose; Space Systems/Loral, Inc., Palo Alto, both of CA (US)

( * ) Notice: Subject to any disclaimer, the term of this patent is extended or adjusted under 35 U.S.C. 154(b) by 0 days.

(21) Appl. No.: 08/710,286

(22) Filed: Sep. 13, 1996

(51) Int. Cl.[7] ....................................................... H04Q 7/20
(52) U.S. Cl. .......................... 455/430; 455/526; 455/427; 455/69; 370/316; 342/352
(58) Field of Search ................................. 455/526, 427, 455/428, 430, 445, 12.1, 13.4, 13.1, 522, 69, 550, 575; 370/316, 318, 349; 342/352, 355, 356, 358

(56) References Cited

U.S. PATENT DOCUMENTS

| | | | |
|---|---|---|---|
| Re. 32,905 | 4/1989 | Baran | 370/104 |
| 4,901,307 | 2/1990 | Gilhousen et al. | 370/18 |
| 5,010,317 | 4/1991 | Schwendeman et al. | 340/311.1 |
| 5,073,900 | 12/1991 | Mallinckrodt | 375/1 |
| 5,081,703 | 1/1992 | Lee | 455/13 |
| 5,109,390 | 4/1992 | Gilhousen et al. | 375/1 |
| 5,119,225 | 6/1992 | Grant et al. | 359/172 |
| 5,216,427 | 6/1993 | Yan et al. | 342/352 |
| 5,233,626 | 8/1993 | Ames | 375/1 |
| 5,239,671 | 8/1993 | Linquist et al. | 455/13.1 |
| 5,303,286 | 4/1994 | Wiedeman | 379/59 |
| 5,339,330 | 8/1994 | Mallinckrodt | 375/1 |
| 5,410,728 | 4/1995 | Bertiger et al. | 455/13.1 |
| 5,415,368 | 5/1995 | Horstein et al. | 244/158 R |
| 5,422,647 | 6/1995 | Hirshfield et al. | 342/354 |
| 5,433,726 | 7/1995 | Horstein et al. | 244/158 R |
| 5,439,190 | 8/1995 | Horstein et al. | 244/158 |
| 5,446,756 | 8/1995 | Mallinckrodt | 375/200 |
| 5,448,623 | 9/1995 | Wiedeman et al. | 379/59 |

FOREIGN PATENT DOCUMENTS

| | | |
|---|---|---|
| 0 421 698 A3 | 10/1991 | (EP) . |
| WO 90/13186 | 11/1990 | (WO) . |
| WO 91/09473 | 6/1991 | (WO) . |
| WO 93/09613 | 5/1993 | (WO) . |

OTHER PUBLICATIONS

Petition of American Mobile Satellite Corporation Before the FCC, Washington, DC 20554, dated Jun. 3, 1991, pp. 1–15.

(List continued on next page.)

Primary Examiner—Reinhard J. Eisenzopf
Assistant Examiner—Darnell R. Armstrong
(74) Attorney, Agent, or Firm—Perman & Green, LLP

(57) ABSTRACT

A local broadcast mode operation is implemented in a point-to-point satellite communications system (10) by utilizing a terrestrial reference terminal or phone (20) that is located within a desired zone of broadcast operation (24). A broadcast service provider (16) places a call to this reference phone through a terrestrial gateway (12) and at least one satellite (18, 19), and then transmits desired broadcast data to the reference phone. The reference phone receives the broadcast data and functions in a conventional manner to provide power control and related satellite handoff feedback information to the gateway. Authorized user terminals (22) within the zone of broadcast operation are enabled to receive the same signal transmitted to the reference phone by placing a call through the gateway to the broadcast service provider. The broadcast service provider verifies the calling user terminal, and the calling user terminal is then directed to switch to the same frequency, spreading code (for a CDMA embodiment), and encryption key (if employed) that is assigned to the reference phone. Preferably only the reference phone closes the power control link with the gateway through the satellite.

12 Claims, 5 Drawing Sheets

OTHER PUBLICATIONS

Application of Motorola Satellite Communications, Inc. for Iridium A Low Earth Orbit Mobile Satellite System before the FCC, Washington, D.C. Dec. 1990, pp. 49–96.

Before the FCC, Washington, D.C. 20554, Aries Constellation Low Earth Orbit Satellite System Proposal of Constellation Communications, Inc. Jun. 3, 1991, Appendix A, B, and C.

Application of TRW Inc. for Authority to Construct a New Communications Satellite System Odyssey before the FCC, Washington, D.C. 20554, May 31, 1991 pp. 33–51.

Application of Ellipsat Corporation Ellipsat for the Authority to Construct Ellipso $^R$I An Elliptical Orbit Satellite System, before the FCC, Washington, D.C. 20554, Nov. 2, 1990, pp. 5–34.

Application of Loral Cellular Systems, Corp., Globalstar Mobile Communications Wherever You Are, before the FCC, Washington, D.C. Jun. 3, 1991, pp. 94–187.

"An Integrated Satellite–Cellular Land Mobile System for Europe", E. Del Re, University of Florence, Dept. of Electronics Engineering, italy, Sep. 21, 1989.

Current and Future Mobile Satellite Communication Systems, S. Kato et al., IEICE Transactions, vol. E 74, No. 8 Aug. 1991, pp. 2201–2210

"Digital Network Oriented Mobile Radio Satellite System as an Integrated Part of the GSM Cellular Radio System in Europe", P. Dondl, Deutsch BUndespost/Fernmeldetechniches Zentralmt/Darmstadt, Sep. 21, 1989, Fed. Rep. Germ.

"The OmniTRACS$^R$ Mobile Satellite Communications and Positioning System", E. Tiedemann, Jr. et al., Vehicle Electronics in the 90's: Proceedings of the In'l Congress on Transporation Electronics, Oct. 1990.

"Software Implementation of a PN Spread Spectrum Receiver to Accommodate Dynamics", C. Cahn et al., IEEE Trans. on Comm., vol. COM–25, No. 8, Aug. 1977,.

"A Communication Technique for Multipath Channels", R. Price, Proceedings of the IR, Mar. 1958, pp. 555–570.

"Increased Capacity Using CDMA for Mobile Satellite Communication", K. Gilhousen et al., IEEE Journal on Selected Areas in Communications, vol. 8, No. 4, May 1990, pp. 503–514.

"The Iridium$^{TM1}$ A Revolutionary Satellite Communications System Developed with Innovative Applications of Technology", D. Sterling et al., IEEE, MILCOM 1991, Nov. 4–7.

"Iridium: Key to Worldwide Cellular Communications", J. Foley, Telecommunications, Oct. 1991, pp. 23–28.

USE OF REFERENCE PHONE IN POINT-TO-POINT SATELLITE COMMUNICATION SYSTEM

FIELD OF THE INVENTION

This invention relates generally to satellite communication systems and, in particular, to a system that employs at least one earth orbiting satellite, at least one ground station or gateway, and a plurality of user or subscriber terminals.

BACKGROUND OF THE INVENTION

Many current or proposed satellite communication systems are designed for point-to-point telephony or data transmission. One such system is described in U.S. Pat. No. 5,448,623, issued Sep. 5, 1995, entitled "Satellite Telecommunications System Using Network Coordinating Gateways Operative with a Terrestrial Communications System", by R. Wiedeman and P. Monte. In such point-to-point systems a need may arise to operate the system in a broadcast mode of operation, wherein the same signal is transmitted to two or more terrestrial receivers. Unfortunately, the implementation of a broadcast mode of operation is not possible unless the ground segment of the satellite communications system (e.g., gateways and user terminals) incorporates the appropriate software. However, the addition of the appropriate software to the ground segment to enable broadcast service may have unacceptable cost and schedule implications. This is especially true in code division multiple access (CDMA) systems wherein system capacity depends critically on effective power control, and this power control is implemented by appropriate signalling between the gateway and the individual subscriber terminal.

OBJECTS OF THE INVENTION

It is a first object of this invention to provide a point-to-point satellite communication system that overcomes the foregoing and other problems.

It is a second object of this invention to provide a point-to-point satellite communication system having a mechanism to implement a broadcast mode of operation for an authorized sub-set of user terminals that are located in the vicinity (e.g., within or on the skirts of a same satellite beam) of a reference terminal or phone.

It is a further object of this invention to provide a point-to-point satellite communication system having a reference terminal or phone that is designated to receive a point-to-point transmission from a broadcast service provider, wherein an authorized sub-set of user terminals that are located in the vicinity (e.g., within a same satellite beam) of the reference phone are enabled to also receive the broadcast service provider's transmission, thereby enabling the sub-set of user terminals to "eavesdrop" on the transmission in a broadcast mode of operation.

SUMMARY OF THE INVENTION

The foregoing and other problems are overcome and the objects of the invention are realized by methods and apparatus in accordance with embodiments of this invention, wherein a local broadcast mode operation is implemented in a point-to-point satellite communications system by utilizing a terrestrial reference terminal or phone that is located within a desired zone of broadcast operation. A broadcast service provider places a call to this reference phone through a terrestrial gateway and then continuously transmits desired broadcast data (e.g., stock market quotations, weather forecasts, etc.) to the reference phone via the gateway and at least one satellite. The reference phone receives the broadcast data and functions in a conventional manner to provide power control and related satellite handoff feedback information to the gateway on a return link, via the at least one satellite. Authorized user terminals within the zone of broadcast operation are enabled to receive the same signal transmitted to the reference phone by placing a call through the gateway to the broadcast service provider. The broadcast service provider verifies that the calling user terminal or the user is authorized to receive the transmission, and the calling user terminal is then directed to switch to the same frequency, spreading code (for a CDMA embodiment), and encryption key (if employed) that is assigned to the reference phone. In an alternate implementation, this authentication could be performed in the gateway itself. The authorized calling user terminal then switches to the indicated channel, employs the same spreading and encryption codes, and thus receives the same signal being transmitted to the reference phone, thereby implementing a broadcast mode of operation.

Preferably the authorized user terminal also disables its return channel transmissions, thereby enabling only the reference phone to close a power control link with the gateway through the satellite. This provides the necessary feedback path to insure that efficient power control is maintained.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
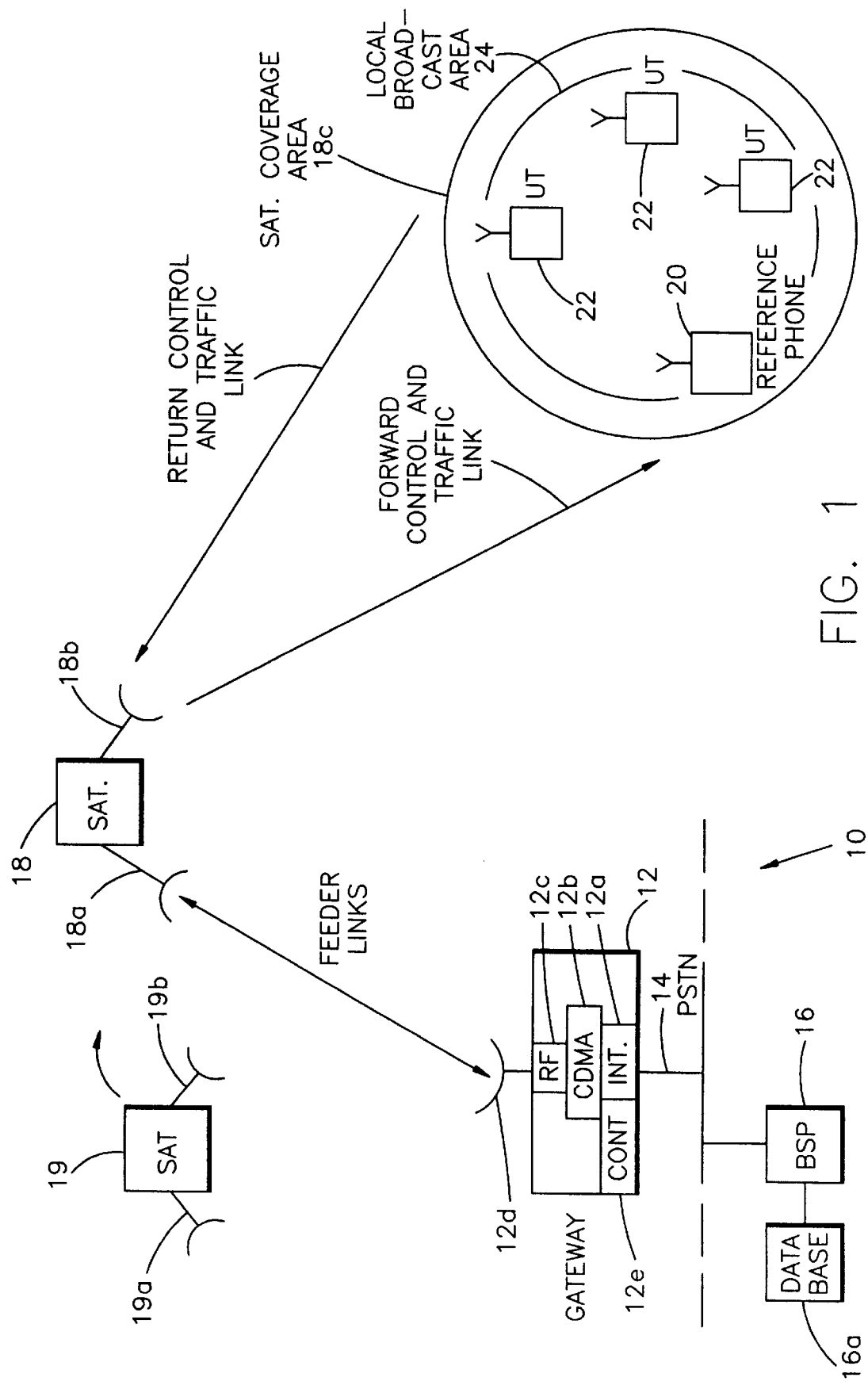
FIG. 1 is block diagram of a satellite communication system that is constructed and operated in accordance with this invention.

Reference is made to FIG. 1 for showing a satellite communication system 10 that operates in accordance with this invention. A gateway 12 includes an interface 12a for connecting to a terrestrial communications system such as the Public Switched Telephone Network (PSTN) 14. Connected to the PSTN 14 is at least one Broadcast Service Provider (BSP) 16. The gateway 12 includes, in this embodiment of the invention, a CDMA subsystem 12b and an RF interface 12c connected to at least one directional feeder link antenna 12d. The CDMA subsystem 12b may operate in a manner similar to that specified in TIA/EIA/IS-95. That is, the CDMA subsystem 12b implements a direct sequence spread spectrum (DS-SS) CDMA subsystem that employs spreading codes (i.e., Walsh codes), pilot channels, user terminal power control, etc. The feeder link antenna 12d is steered to track a satellite 18 as the satellite 18 passes overhead. The satellite 18 includes a feeder link transmit/ receive antenna 18a and a user transmit/receive antenna 18b. One suitable, but not limiting, embodiment of the communications payload of the satellite 18 is described in U.S. Pat. No. : 5,422,647, issued Jun. 6, 1996, entitled "Mobile Communication Satellite Payload", by E. Hirshfield et al. Reference can also be had to U.S. Pat. No. : 5,504,493, issued Apr. 2, 1996, entitled "Active Transmit Phased Array Antenna with Amplitude Taper", by E. Hirshfield.

Figure 5A:
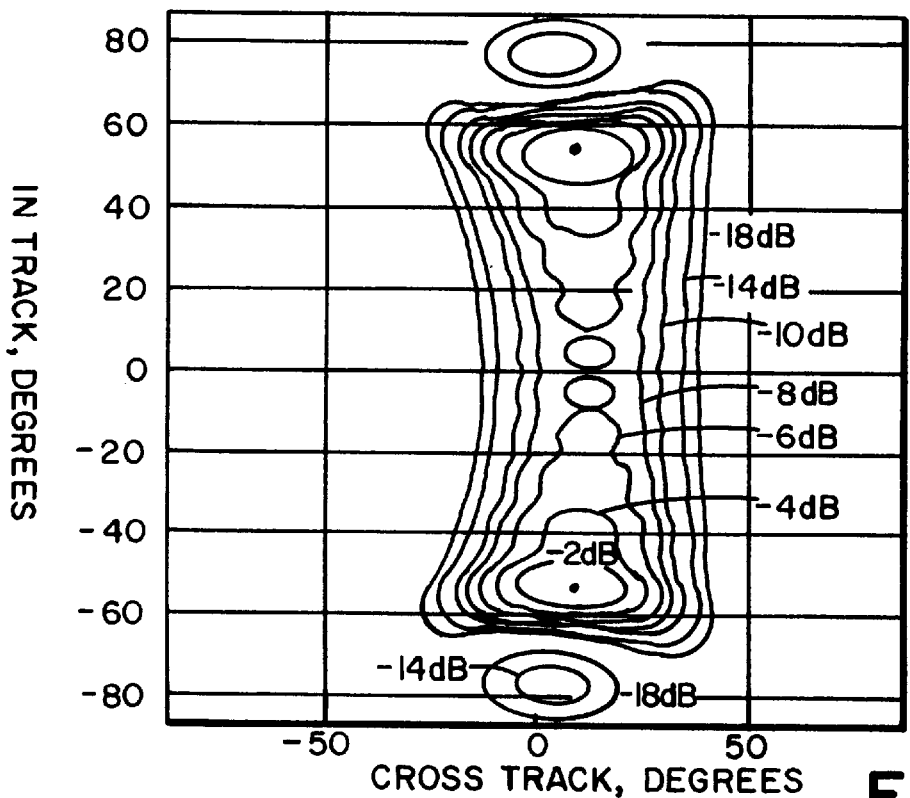
FIGS. 5A–5C illustrates exemplary satellite beam profiles at the earth's surface for inner, middle and outer beams, respectively.
Figure 5B:
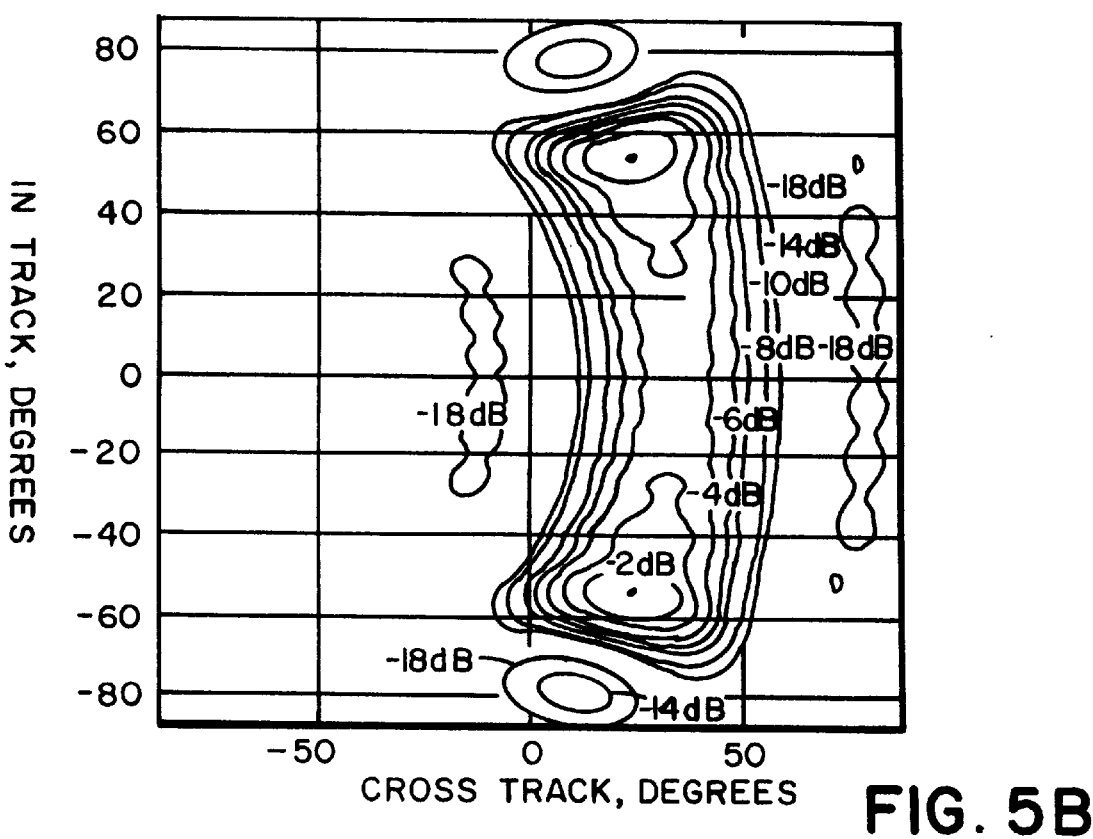
Figure 5C:
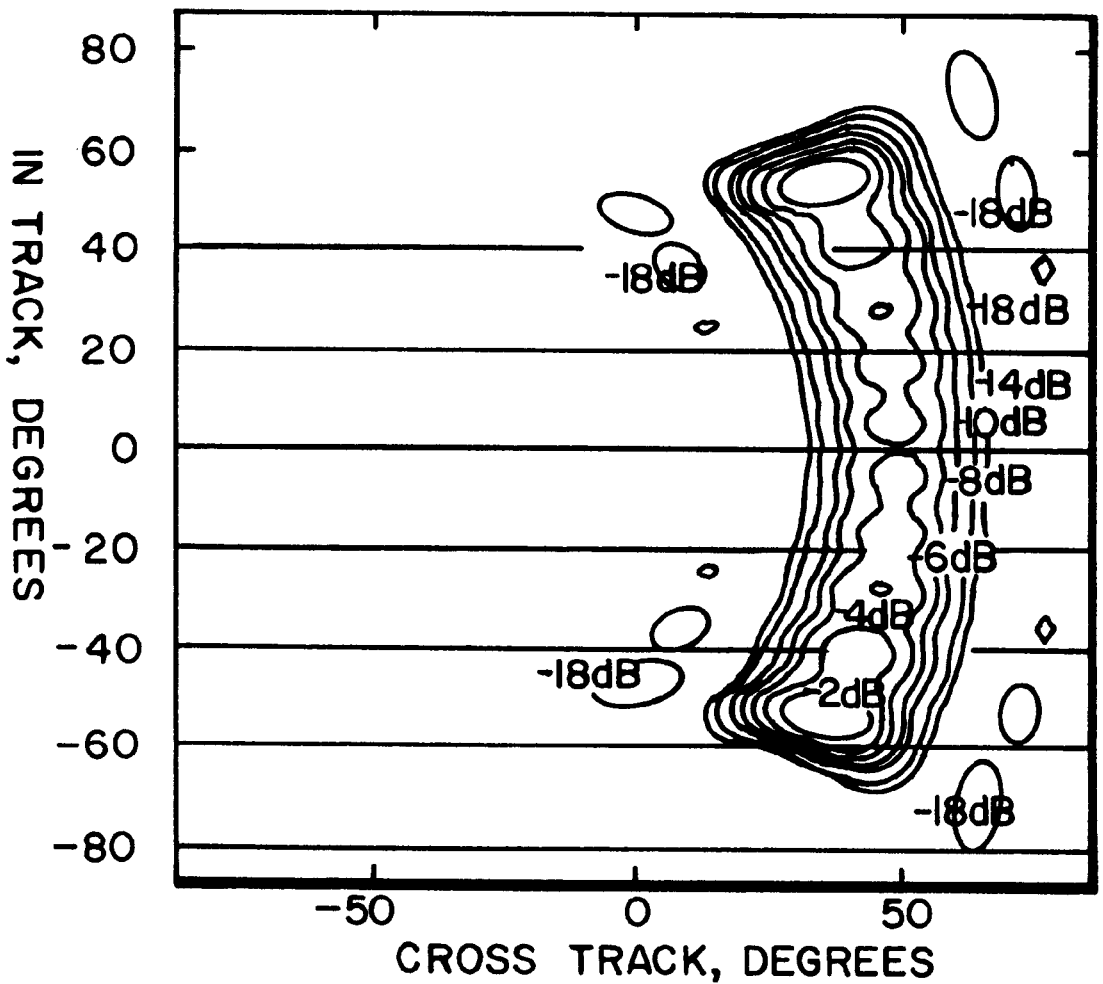

In a presently preferred embodiment of this invention the satellite 18, along with one or more other satellites 19, forms a portion of a low earth orbit (LEO) or medium earth orbit (MEO) constellation. It should be noted, however, that the use of one or more geosynchronous earth orbit (GEO) satellites is also within the scope of the teaching of this invention. As the satellite 18 orbits the earth it provides a multi-beam coverage area 18c on the surface of the earth. This coverage area may have a diameter of hundreds or thousands of kilometers. FIGS. 5A–5C illustrate exemplary beam profiles of the satellite 18 at the earth's surface for inner, middle and outer beams, respectively, as shown in a publication entitled "Globalstar", Application of Loral Cellular Systems, Corp. before the Federal Communications Commission, Washington, D.C., Jun. 3, 1991, pp. 125–130.

In the presently preferred, but not limiting, embodiment of this invention there are a total of 48 satellites in, by example, an approximately 1400 km Low Earth Orbit (LEO).

The satellites are distributed in eight orbital planes with six equally-spaced satellites per plane (Walker constellation). The orbital planes are inclined at 52 degrees with respect to the equator and each satellite completes an orbit once every 114 minutes. This approach provides approximately full-earth coverage with, preferably, at least two satellites in view at any given time from a particular user location between about 70 degree south latitude and about 70 degree north latitude. As such, a user is enabled to communicate to or from nearly any point on the earth's surface within a coverage area of a gateway 12 to or from other points on the earth's surface (by way of the PSTN).

The low earth orbits permit low-powered fixed or mobile user terminals 22 to communicate via the satellites 18 and 19, each of which functions, in a presently preferred embodiment of this invention, solely as a "bent pipe" repeater to receive a communications traffic signal (such as speech and/or data) from a user terminal 22 or from the gateway 12, convert the received communications traffic signal to another frequency band, and to then re-transmit the converted signal. The teaching of the instant invention is not limited, however, only to the use of a "bent pipe" satellite transponder, and satellite constellations that employ on-board signal processing, with or without satellite crosslinks, may also be a used, as may MEO and GEO satellites and constellations thereof. Path diversity may be utilized, wherein the desired data is sent via CDMA over two or more satellites and a rake receiver is used to constructively combine these signals, thus achieving processing gain and reducing the probability of signal loss due to path blockage.

The user terminals 22 may be capable of operating in a full duplex mode and communicate via, by example, L-band RF links (uplink or return link 17b) and S-band RF links (downlink or forward link 17a) through return and forward satellite transponders, respectively. The return L band RF links may operate within a frequency range of 1.61 GHz to 1.625 GHz, a bandwidth of 16.5 MHz, and can be modulated with packetized digital voice signals and/or data signals in accordance with the preferred spread spectrum technique.

The forward S band RF links may operate within a frequency range of 2.485 GHz to 2.5 GHz, a bandwidth of 16.5 MHz. The forward RF links 17a are also modulated at the gateway 12 with packetized digital voice signals and/or data signals in accordance with the spread spectrum technique.

The 16.5 MHz bandwidth of the forward link is partitioned into 13 frequency channels with up to, by example, 128 users being assigned per channel. The return link may have various bandwidths, and a given user terminal may or may not be assigned a different channel than the channel assigned on the forward link. However, when operating in the diversity reception mode on the return link (receiving from two or more satellites 18 and 19), the user terminal 22 is assigned the same forward and return link RF channel for each of the satellites.

The ground segment includes at least one but generally a plurality of the gateways 12 that communicate with the satellites via, by example, a full duplex C band RF feeder link (to the satellite), and a return feeder link (from the satellite) that operates within a range of frequencies generally above 3 GHz and preferably in the C-band. The C-band RF links bi-directionally convey the communication feeder links, and also convey satellite commands to the satellites and telemetry information from the satellites. The forward feeder link may operate in the band of 5 GHz to 5.25 GHz, while the return feeder link 19b may operate in the band of 6.875 GHz to 7.075 GHz.

The satellite feeder link antennas (shown collectively in FIG. 1 as the antenna 18a) are preferably wide coverage antennas that subtend a maximum earth coverage area as seen from the satellite 18. In the presently preferred embodiment of the communication system 10 the angle subtended from a given LEO satellite 18 or 19 (assuming 10° elevation angles from the earth's surface) is approximately 110°. This yields a coverage zone that is approximately 3600 miles in diameter.

The L-band and the S-band antennas (shown collectively in FIG. 1 as the antenna 18b) are multiple beam antennas that provide coverage within an associated terrestrial service region.

As an example, several thousand full duplex communications may occur through a given one of the satellites 18. In accordance with a feature of the system 10, two or more satellites 18 and 19 may each convey the same communication between a given user terminal 22 and one of the gateways 12. This mode of operation provides for diversity combining at the user terminals 22, leading to an increased resistance to fading and facilitating the implementation of a soft handoff procedure.

It is pointed out that all of the frequencies, bandwidths and the like that are described herein are representative of but one particular system. Other frequencies and bands of frequencies may be used with no change in the principles being discussed. As but one example, the feeder links between the gateways and the satellites may use frequencies in a band other than the C-band, for example the Ku band (approximately 10 GHz to approximately 15 GHz) or the Ka band (above approximately 15 GHZ).

In accordance with the teaching of this invention, a reference user terminal, referred to herein as a reference phone 20, is provided at a terrestrial location. Also provided at terrestrial locations are a plurality of the subscriber or user terminals (UTs) 22. At any given time the reference phone 20 and the user terminals 22 will be within the coverage area of one or more of the satellites 18 and 19. By example, the user terminals 22 may all be located within or on the skirts of the same satellite beam that services the reference phone 20.

Figure 2:
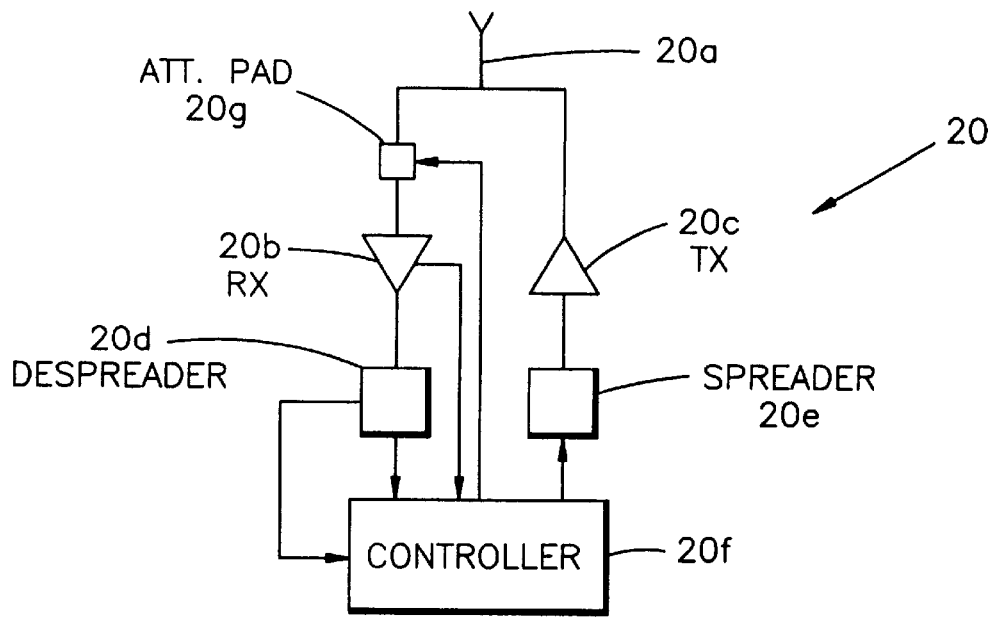
FIG. 2 is a simplified block diagram of the reference phone of FIG. 1.
Figure 3:
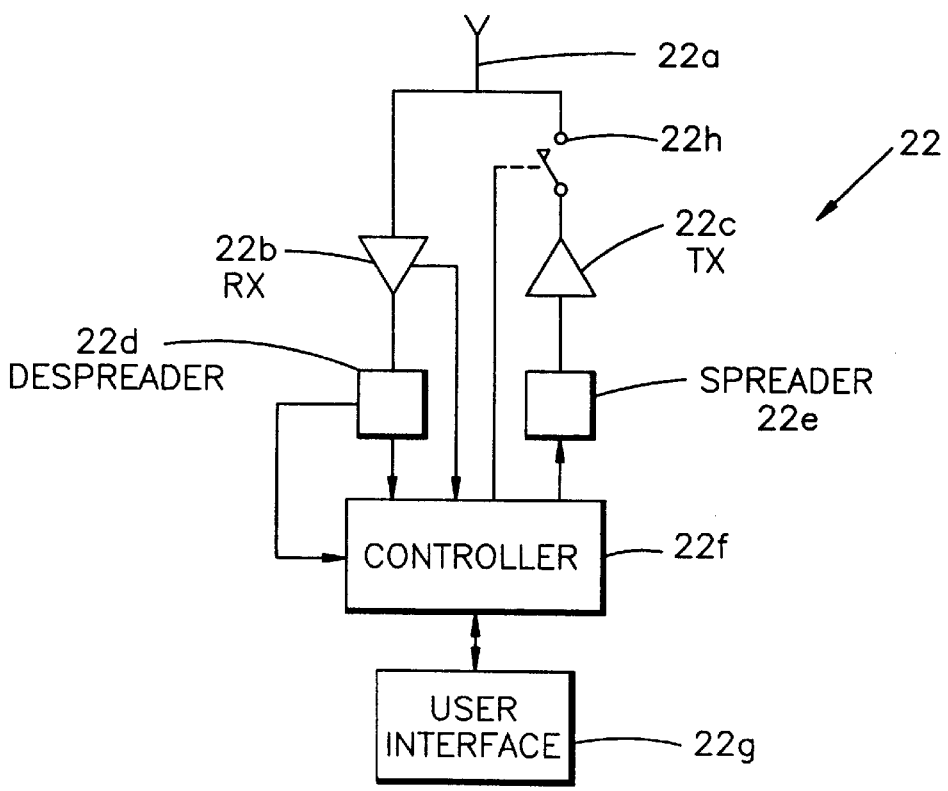
FIG. 3 is a simplified block diagram of one of the user terminals of FIG. 1.

FIG. 2 is a simplified block diagram of the reference phone 20 of FIG. 1, while FIG. 3 is a simplified block diagram of one of the user terminals 22 of FIG. 1. The reference phone 20 includes an antenna 20a, which may be an omni-directional antenna having the same characteristics as the antenna 22a of the user terminal 22. It is also within the scope of this invention for the reference phone 20 to employ an antenna such as that described in commonly assigned U.S. Pat. No. : 5,552,798, issued Sep. 3, 1996, entitled "Antenna for Multipath Communication Links", by F. Dietrich and P. Monte. The antenna 20a may be mounted atop a mast or building to avoid obstructions and shadowing from foliage, other buildings, etc. Coupled to the antenna 20a is a receiver (RX) 20b and a transmitter (TX) 20c (collectively referred to as a transceiver). The receiver 20b and transmitter 20c are both tuneable within a range of receive and transmit frequencies so as to be able to acquire an assigned receive frequency channel and an assigned transmit frequency channel. These channel assignments are received on the forward control link, from or through the gateway 12, when an incoming call from the BSP 16 is established for the reference phone 20.

For the presently preferred DS-SS CDMA embodiment of this invention, the reference phone 20 includes a received signal correlator or despreader 20d and a transmission signal spreader 20e. The despreader 20d and spreader 20e may operate in a conventional manner and employ an assigned despread and spread code (e.g., a Walsh code or codes) to the received and transmitted signals, respectively. One suitable embodiment for the received signal despreader and correlator can be found in U.S. Pat. No. : 5,233,626, issued on Aug. 3, 1993, entitled "Repeater Diversity Spread Spectrum Communications System" by S. Ames. That is, the reference phone 20 may receive multiple signals from multiple gateway antennas 12d that are relayed through a plurality of the satellites 18 and 19, and may then coherently combine the received signals.

In other embodiments of this invention, for example a Time Division Multiple Access (TDMA) embodiment, the despreader and spreader are replaced with suitable frame and slot circuitry for extracting a received signal from an assigned time slot in a forward (received) frame structure, and for inserting information into an assigned time slot of a reverse (transmitted) frame structure.

The reference phone 20 is assumed to employ suitable signal modulators and demodulators (not shown), such as phase or frequency modulators and demodulators, and any other RF circuitry required to bidirectionally communicate with the gateway 12 through the one or more satellites 18 and 19.

The reference phone 20 also includes a controller 20f that has overall control of the reception, transmission, and other operations of the reference phone 20, such as implementing a specified encryption/decryption algorithm. The controller 20f may be coupled to the receiver 20b for receiving signal strength information, and/or to the despreader and demodulator for receiving signal quality information, such as bit, word, and/or frame error rates. This information is employed by the controller 20f for sending forward link signal quality power control-related information back to the gateway 12 via the spreader 20e, transmitter 20c, antenna 20a, and at least one of the satellites 18 and 19. This may be the same type of controller that would be used in a normal user terminal.

As will be described below, the reference phone 20 may also include an attenuation pad 20g that is inserted into the receive signal path. The attenuation pad may have a fixed value (e.g., 1 dB), or may have a variable value (e.g., in 1 dB steps) that is controlled by the controller 20f. The reference phone 20 may or may not have a user interface, such as a keypad, display, etc.

The purpose of the pad 20g is to desensitize the reference phone by a controlled amount, thus causing the gateway to transmit enough "extra" power to compensate for UTs in the service area who may be on the skirts of the beam.

It can be appreciated that the reference phone can thus be substantially identical to a conventional user terminal 22, with the exception of the attenuation pad 20g, and is not required to be especially engineered or developed for use in the broadcast service mode of the system 10. Furthermore, it should be appreciated that the attenuation pad 20g need not be a physical component, and that instead the operating program of the controller 20f may be modified so as to subtract some fixed or variable offset from the received signal strength or quality, thereby implementing the function of the attenuation pad 20g in software.

The user terminal 22 of FIG. 3 is constructed in a similar manner to the reference phone 20. Significant differences include the addition of the user interface 22g, the elimination of the attenuation pad 20g, and the inclusion of a means for disabling the transmitter path when receiving a broadcast communication form the BSP 16. This transmission disabling means is shown schematically as a switch 22h that is selectively opened and closed by the controller 20f. As will be described below, when receiving a broadcast communication it is desirable that only the reference phone 20 transmit power control and other signal reception related information back to the gateway 12. That is, only the reference phone 20 closes the power control link with the gateway 12 and, as a result, all forward power control commands, and beam-to-beam and satellite-to-satellite handoffs, are based on received power indications that are transmitted from only the reference phone 20. In a sense, the reference phone 20 can be considered to close the power control loop for all of the user terminals 22 that are receiving the same signal as the reference phone 20.

It should be realized that the user terminal 22 may also include circuitry (not shown) for communicating with a terrestrial cellular system, as is described in, by example, FIG. 5 of the above-referenced U.S. Pat. No. 5,448,623, issued Sep. 5, 1995, entitled "Satellite Telecommunications System Using Network Coordinating Gateways Operative with a Terrestrial Communications System", by R. Wiedeman and P. Monte.

Referring again to FIG. 1, the gateway 12 also includes a local controller (CONT) 12e which manages and directs the overall operations of the gateway 12, including determining power control commands for the reference phone 20 and user terminals 22, and also beam-to-beam and satellite-to-satellite handoff.

In accordance with an aspect of this invention, the reference phone 20 is used to enable a plurality of the user terminals 22 to simultaneously receive a broadcast transmission from the broadcast service provider 16, via the gateway 12 and one or more of the satellites 18 and 19.

More particularly, the gateway 12 and BSP 16 cooperate to cause the gateway 12 to place a call to the reference phone 20, which is assumed to be located in a desired broadcast local area (for example in an urban area). When placing the call the controller 12e of the gateway 12, or some remote system controller (not shown), assigns a traffic channel frequency, spreading code (e.g., Walsh code), encryption key (if used), and any other call parameters needed by the reference phone 20 to receive and decode the traffic channel transmission. The reference phone 20 thereafter functions in a normal manner to provide appropriate power control and satellite handoff feedback information to the gateway 12. The desired broadcast data from the Broadcast Service Provider 16 is then transmitted to the reference phone 20 over the assigned traffic channel, via the gateway 12 and at least one satellite 18. The power control loop insures that a proper signal level is achieved at, and in the vicinity of, the location of the reference phone 20.

Further in accordance with this invention, any number of the user terminals 22 that are located in the vicinity of the reference phone 20 can be directed to also receive or "eavesdrop" on the signal transmitted to the reference phone 20.

In a exemplary embodiment of this invention, a subscriber to a broadcast service provided by the BSP 16 originates a call from one of the UTs 22 through the gateway 12 to the BSP 16. Based on information transmitted from the UT 22, such as an identification code that is either unique to the UT or to the user, the BSP 16 validates that the call originated from an authorized subscriber to the BSP 16. This can be accomplished by maintaining a data base 16a of authorized subscribers at the BSP 16. Assuming that the user of the UT 22 is an authorized subscriber, in one embodiment this invention the BSP 16 transmits information to UT 22, via the gateway 12, to inform the UT 22 of the call parameters, such as the traffic channel frequency, spreading code, encryption key (if used), and any other necessary parameters, that are currently assigned to the reference phone 20.

Alternatively, the BSP 16 signals the gateway 12 that a particular one of the UTs 22 is an authorized subscriber of the BSP 16, and the gateway 12 then transmits to the authorized UT 22 the traffic channel frequency, spreading code, encryption key (if used), and any other necessary call parameters that are currently assigned to the reference phone 20.

It is also within the scope of this invention to maintain a current copy of the data base 16a in the gateway 12, or in the ground segment controller (not shown) that is bidirectionally coupled to the gateway 12 through communication links, and to thus verify the validity of a subscriber UT 22 external to the BSP 16. In this case the gateway 12 identifies the number called by the UT 22 as being associated with the BSP 16, validates the UT or caller as being a current subscriber, and then makes a traffic channel assignment to the UT 22 (where the assigned traffic channel, and associated parameters, is the forward traffic channel that is already assigned to the reference phone 20). Appropriate signalling between the gateway 12 (or the ground segment controller) and the BSP 16 enables the BSP 16 to account for the connection time of the UT 22 to the BSP's transmission.

In any of these cases, the call set-up information is transmitted in a predetermined message format to the UT 22.

The UT 22 automatically responds to this predetermined message format by tuning its receiver 22b to the traffic channel assigned to the reference phone 20, and by then employing the reference phone's spreading code and encryption key to receive the same transmission that the reference phone 20 receives. The UT 22 preferably disables its return link transmissions using the switch 22h when receiving the reference phone's transmission, such that any return link information relating to received power, received signal quality, and the like is transmitted only by the reference phone 20.

The switch 22h can be subsequently closed, when terminating the receipt of the broadcast information, so that the UT 22 may transmit a suitable termination message to the gateway 12. In this manner the total connection time of the UT 22 to the BSP 16 can be properly accounted for. For embodiments wherein the total connection time is not of importance (i.e., the user is billed only for connecting to the BSP 16), the specific transmission of a call completion message may not be required. However, the gateway 12 is preferably kept apprised of the connection state of the UT 22, as the gateway 12 may need to know if the UT 22 is busy (not available to receive a call) should a call be received from the PSTN 14 for the UT 22. It is also within the scope of the teaching of this invention that a Short Message Service (SMS) channel may be used to inform the gateway of the UT state or implement any special signalling that may be desired.

The transmission received from the BSP 16 can be stored and displayed locally in the UT 22, and/or may be provided to an external data processor, through a suitable data connection, for display and storage. If the broadcast transmission includes an audio portion, then the audio portion is decoded and made audible in a conventional fashion.

As can be appreciated, some hundreds or even thousands of UTs 22, located within a local broadcast area 24 that includes the location of the reference phone 20 (such as the same beam), can all simultaneously receive the same information that is transmitted from the BSP 16 to the reference phone 20, thereby implementing a broadcast, as opposed to a point-to-point, communication service. Furthermore, the simultaneous presence of a large number of the BSP subscriber UTs 22 does not significantly impact the overall capacity of the system 10, as they all share the same receive frequency channel and spreading code as the reference terminal 20, and because effective power control is maintained through the feedback from the reference phone 20.

The size of the local broadcast area 24 is typically somewhat smaller than the satellite antenna beam footprint. For typical satellite systems, the local broadcast area 24 may be up to a few hundred kilometers in diameter.

The encryption code (and/or spreading code) that is assigned to the reference phone 20 is preferably periodically changed to prevent those users whose subscriptions have lapsed from receiving transmissions from the BSP 16. A suitable signalling protocol between the gateway controller 12e and the BSP 16 can be used to enable the BSP 16 to become aware of any such changes in the encryption code and/or spreading code that is assigned to the reference phone 20, as well as to become aware, if necessary, of the codes assigned when the reference phone 20 is first called from the BSP 16.

For example, in one embodiment of this invention this information may also be stored in the data base 16a, so that it can be provided to a subscriber's UT 22 when placing the call to the BSP 16. Alternatively, the BSP 16 is not aware of the specifics of the reference phone's channel and code assignments, and the gateway 12 manages the storage and transmission of this information to a UT 22 that originates a call to the BSP 16.

In accordance with the teachings of this invention any number of UTs 22 can monitor the signal being sent to the reference phone 20, yet the software executed by the gateway controller 12e does not require significant modification, except for implementing a mechanism to identify the frequency, spreading code, and encryption code to the UTs 22 that are subscribers to the BSP 16.

In an alternate embodiment, the gateway software may incorporate a provision to insure that the gateway signal is sent to all satellite beams that illuminate the desired broadcast service area 24. This avoids the need for some users to operate on the skirts of a beam during beam transitions.

In a simplest case, the gateway 12 identifies from the number called by the UT 22 that the broadcast service associated with the BSP 16 is desired, and then assigns the (validated) UT 22 to the same call parameters (e.g., traffic channel frequency, spreading code (s), encryption code) as the terminal (i.e., the reference phone 20) that was previously called by the BSP 16. The traffic channel assignment to the UT 22 in this case may include the transmission of a message that indicates, in addition to the traffic channel assignment, that the UT 22 is not to transmit any return link power control information.

Similarly, the BSP subscriber UTs 22 require no significant modification except to implement the mechanism to disable their return link transmissions while they are in the broadcast reception mode, and to identify and respond to the frequency, spreading code, encryption code, and beam switching activity of the reference phone 20. These features may be implemented by defining or modifying a suitable signalling protocol between the UTs 22 and the gateway 12.

Some amount of excess satellite transmission power is desirable to insure that UTs 22 located in specular nulls or in less favorable portions of the beam of satellite 18 can receive an adequate signal strength. This can be achieved by inserting the fixed or variable attenuation pad 20g at the RF input of the reference phone 20. When using a linear satellite transponder, in accordance with a presently preferred embodiment of this invention, every dB of attenuation introduced by the pad 20g provides one dB of "excess" power that is transmitted by the satellite 18. That is, the reference phone 20 detects and reports to the gateway 12 a smaller amount of received RF power than is actually being transmitted from the gateway 12, via the linear repeater located aboard the satellite 18. In response, the gateway 12 increases its transmission power to the reference phone 20, thereby increasing the power budget and margin for all BSP subscriber UTs 22 within the local broadcast area 24.

In accordance with the teachings of this invention the use of the reference phone 20 provides a transparent method by which to control gateway power and handoff parameters for all of the BSP subscriber UTs 22. That is, the reference phone 20 acts as a surrogate, insofar as the return link is concerned, for all of the BSP subscriber UTs 22 that are located within the local broadcast area 24, and that are receiving the same transmission from the BSP 16.

While the user terminals 22 may operate to determine forward link signal quality information (e.g., received signal strength, signal to noise ratio, and/or data bit, word and/or frame error information) in a conventional manner when operating in the broadcast reception mode, the user terminals are inhibited with the physical or logical switch 22h from transmitting this forward link signal quality information back to the gateway 12, via the at least one of the satellites 18 and 19. Alternatively, when operating in the broadcast reception mode the controller 22f may simply not determine or calculate any forward link signal quality information.

As such, the disclosed technique for broadcast mode power control is closed loop, and does not rely on any open loop calculations made by the controller 12e of the gateway 12. This technique furthermore also automatically compensates for variations in satellite transponder gain (which can be several dB), and f or variations in path loss due to rainfall or other phenomena in the vicinity of the reference phone 20. This technique of relying on the return link from the reference phone 20, which closes the power control loop, also permits operating the broadcast service at reduced power levels (over what would be required if open loop power calculations were instead made by the gateway 12), thus reducing th e impact on overall system capacity.

Figure 4:
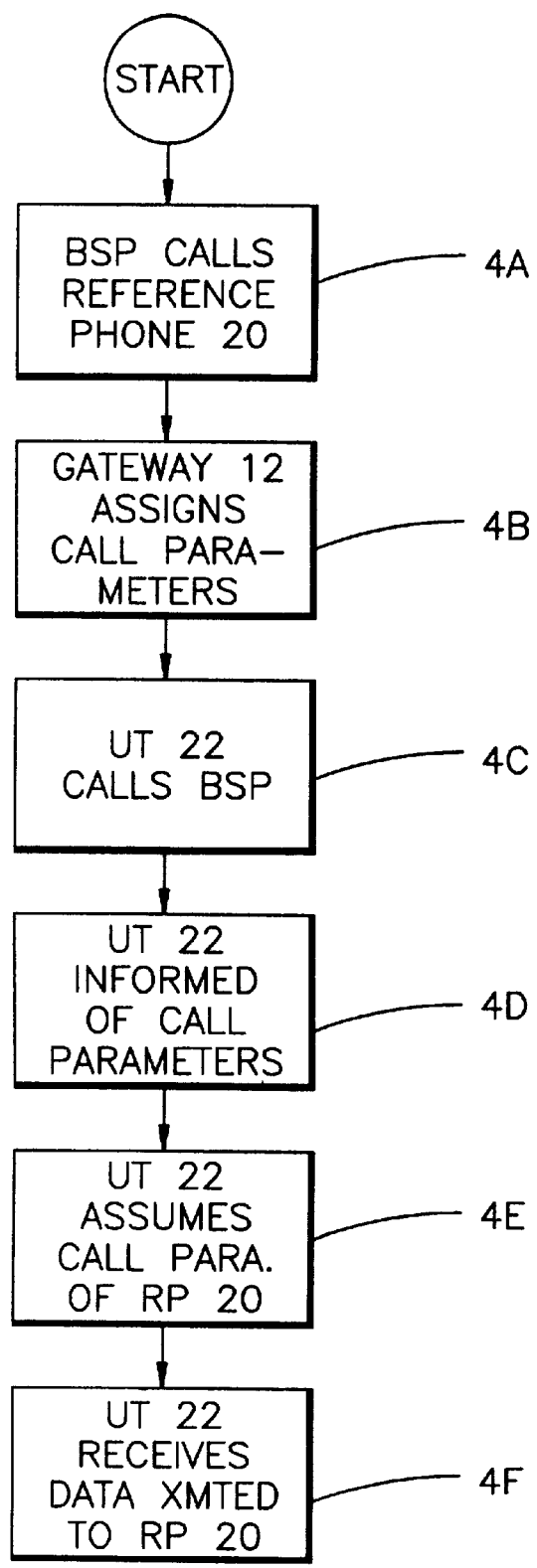
FIG. 4 is a logic flow diagram of a method in accordance with the teaching of this invention.

In accordance with an aspect of this invention, and referring to FIG. 4, there is provided a method for use in a satellite communication system for providing a broadcast service. The method includes the a first step of (Block 4A) calling a reference phone from a broadcast service provider, the reference phone being located at a terrestrial location. At Block 4B the method assigns call parameters with a terrestrial satellite communication controller for completing the call from the broadcast service provider to the reference phone, and transmits information from the broadcast service provider to the reference phone. The information is transmitted through a terrestrial gateway and at least one earth orbiting satellite. At Block 4C there is performed a step of calling a predetermined telephone number associated with the broadcast service provider from a user terminal in the vicinity of the terrestrial location of the reference phone. At Block 4D the calling user terminal is assigned call parameters by the terrestrial satellite communication controller for enabling the user terminal to receive the same information as the reference phone that is being transmitted through the terrestrial gateway and the at least one earth orbiting satellite. The calling user terminal assumes the assigned call parameters and, at Block 4F, receives the information transmitted by the broadcast service provider, the information being received simultaneously by the reference phone.

It should be appreciated that the BSP 16 may call a plurality of reference phones 20 that are located at different terrestrial locations, through the same or different gateways, and may simultaneously transmit the desired broadcast information to the plurality of reference phones. By example, one reference phone may located in Chicago, another reference phone may be located in London, while another may be located in Tokyo. It should further be appreciated that a plurality of BSPs 16 may all employ respective reference phones, and that a plurality of different broadcast services may all be simultaneously provided by the gateway 12 and satellites 18 and 19.

Thus, while the invention has been particularly shown and described with respect to preferred embodiments thereof, it will be understood by those skilled in the art that changes in form and details may be made therein without departing from the scope and spirit of the invention.

What is claimed is:

1. In a satellite communication system, a method of providing a broadcast service, comprising the steps of:

initiating a call between a reference phone and a broadcast service provider, the reference phone being located at a terrestrial location;

assigning call parameters to the reference phone with a terrestrial satellite communication controller for completing the call between the broadcast service provider and the reference phone;

transmitting information from the broadcast service provider to the reference phone, the information being transmitted through a terrestrial gateway and at least one earth orbiting satellite over a forward RF link;

calling a predetermined telephone number associated with the broadcast service provider from a user terminal in the vicinity of the terrestrial location of the reference phone;

assigning call parameters with the terrestrial satellite communication controller to the user terminal for enabling the user terminal to receive the same information as the reference phone, the same information being transmitted through the terrestrial gateway and the at least one earth orbiting satellite over the forward RF link; and receiving the transmitted information with the user terminal, the transmitted information being received simultaneously by the reference phone; wherein the step of transmitting information from the broadcast service provider to the reference phone includes a step of determining, in the reference phone, signal quality information for the forward RF link, and a step of transmitting the determined signal quality information from the reference phone to the terrestrial gateway through the at least one earth orbiting satellite for enabling the terrestrial gateway to control at least the transmitted power of the forward RF link to the reference Phone and to the user terminal in accordance with the forward RF link signal quality information that is determined by the reference phone.

2. A method as set forth in claim 1, wherein the steps of assigning call parameters each include a step of assigning at least a reception frequency.

3. A method as set forth in claim 1, wherein the steps of assigning call parameters each include a step of assigning at least a despreading code.

4. A method as set forth in claim 1, wherein the step of assigning call parameters each include a step of assigning at least a decryption code.

5. A method as set forth in claim 1, wherein the step of assigning call parameters with the terrestrial satellite communication controller to the user terminal includes an initial step of determining whether the user terminal is authorized to receive the transmitted information, and assigning the call parameters to the user terminal only if the user terminal is determined to be authorized.

6. A method as set forth in claim 1, wherein the step of receiving the transmitted information with the user terminal includes a step of inhibiting at least the transmission of forward RF link signal quality information from the user terminal to the terrestrial gateway through the at least one earth orbiting satellite.

7. A method as set forth in claim 1, wherein the step of determining the forward RF link signal quality information includes a step of decreasing the forward link signal quality information by a constant or a variable amount.

8. A satellite communication system, comprising:
at least one terrestrial gateway;
at least one terrestrial reference phone;
at least one terrestrial user terminal;
at least one satellite in earth orbit that is bidirectionally coupled to said terrestrial gateway, to said reference phone and to said user terminal through RF links; and
at least one broadcast service provider that is coupled to said terrestrial gateway for transmitting information to said reference phone on a signal carried by a power controlled forward link through said at least one satellite; wherein
said reference phone and said user terminal are both assigned the same call parameters through said gateway for simultaneously receiving the transmitted information on the signal carried by the power controlled forward link; and wherein
only said reference phone transmits forward link signal quality information to said gateway through said at least one satellite, the transmitted forward link signal quality information being determined by the reference phone based upon the signal received by the reference phone from the power controlled forward link.

9. A reference phone for use in a satellite communication system having broadcast capabilities, comprising:
a transceiver for transmitting and receiving RF signals, having encoded information, with a terrestrial gateway through reverse and forward links, respectively, via at least one earth orbiting satellite;
circuitry for extracting broadcast information from an RF signal received over the forward link; and
means, coupled to said transceiver, for determining forward link signal quality information, said determining means comprising means for decreasing the forward link quality information by a constant or variable amount, and means for transmitting an indication of the decreased forward link quality information to said gateway over the reverse link.

10. A user terminal for use in a satellite communication system having broadcast capabilities, comprising:
a transceiver for transmitting and receiving RF signals, having encoded information, with a terrestrial gateway through reverse and forward links, respectively, via at least one earth orbiting satellite;
circuitry for extracting encoded broadcast information from an RF signal received over the forward link, said circuitry being operable for receiving the encoded broadcast information using parameters that are simultaneously used by other user terminals and by at least one reference phone to which the parameters are originally assigned; and
means, coupled to said transceiver, for inhibiting a transmission of forward link signal quality information to said gateway over the reverse link while receiving said encoded broadcast information.

11. In a satellite communication system, a method of providing a broadcast service, comprising the steps of:
establishing a broadcast transmission to a broadcast service area using at least one satellite beam, the broadcast transmission originating at a broadcast service provider and terminating with a broadcast terminal via a power controlled RF link made through a terrestrial gateway and at least one satellite, the broadcast transmission being modulated onto a carrier wave of a predetermined frequency channel using a code division multiple access (CDMA) technique that employs a predetermined code, the predetermined frequency channel and the predetermined code being assigned by for use by the broadcast terminal;
assigning a user terminal that requests to receive the broadcast transmission to use the same frequency channel and the same code as the broadcast terminal;
simultaneously receiving the broadcast transmission with the user terminal and with the broadcast terminal, the broadcast transmission being simultaneously received from the assigned frequency channel by despreading the received transmission using the assigned code; and
during the step of simultaneously receiving, determining, in at least the broadcast terminal, closed loop power control indications from the received broadcast transmission, and transmitting the determined closed loop power control indications to the terrestrial gateway only from the broadcast terminal for controlling the power of the RF link to both the broadcast terminal and the user terminal.

12. A method as in claim 11, wherein the closed loop power control indications are determined so as to indicate that excess RF link power is required.

* * * * *